(12) United States Patent
Jia et al.

(10) Patent No.: US 10,121,422 B2
(45) Date of Patent: Nov. 6, 2018

(54) DISPLAY DEVICE

(71) Applicant: BOE TECHNOLOGY GROUP CO., LTD., Beijing (CN)

(72) Inventors: Wenbin Jia, Beijing (CN); Ronggang Shangguan, Beijing (CN); Xinwei Gao, Beijing (CN); Guangcai Yuan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 183 days.

(21) Appl. No.: 15/095,353

(22) Filed: Apr. 11, 2016

(65) Prior Publication Data
US 2017/0084219 A1 Mar. 23, 2017

(30) Foreign Application Priority Data

Sep. 18, 2015 (CN) .......................... 2015 1 0601402

(51) Int. Cl.
*G09G 3/20* (2006.01)
*G09G 3/36* (2006.01)
*G02F 1/133* (2006.01)

(52) U.S. Cl.
CPC .............. *G09G 3/36* (2013.01); *G02F 1/133* (2013.01); *G09G 2300/0426* (2013.01)

(58) Field of Classification Search
CPC .. G02F 1/0128; G02F 1/0131; G02F 2203/12; G02F 2203/62; G09G 3/36;
(Continued)

(56) References Cited

U.S. PATENT DOCUMENTS 8,193,735 B2 * 6/2012 Wei .......................... F21K 9/00
315/150
2007/0115234 A1 5/2007 Kim
(Continued)

FOREIGN PATENT DOCUMENTS

CN 2544303 Y 4/2003
CN 103226273 A 7/2013
(Continued)

OTHER PUBLICATIONS

Zhang et al. (Piezofluorochromism of an Aggregation-Induced Emission Compound Derived from Tetraphenylethylene, Chemistry—An Asian Journal, vol. 6, Jan. 11, 2011, pp. 808-811.*
(Continued)

*Primary Examiner* — Stacy Khoo
(74) *Attorney, Agent, or Firm* — Dilworth & Barrese, LLP.; Michael J. Musella, Esq.

(57) ABSTRACT

A display device includes: a plurality of pixel units, where each pixel unit includes two suppression color changing sub-pixel units configured for exciting light waves of different colors. Each suppression color changing sub-pixel unit includes: a first transparent electrostatic sheet and a second transparent electrostatic sheet which are disposed opposite to each other and insulated from each other, where the first transparent electrostatic sheet is disposed on a substrate and the second transparent electrostatic sheet is disposed on the first transparent electrostatic sheet. The display device further includes: a suppression color changing light emitting layer disposed between the first transparent electrostatic sheet and the second transparent electrostatic sheet; and a transparent pressure deformation sensor disposed at a side of the second transparent electrostatic that is away from the substrate.

17 Claims, 2 Drawing Sheets

(58) Field of Classification Search
CPC ......... G09G 2300/0426; G09G 3/2003; G09G 3/3225; G09G 2320/0242; G09G 2300/0452
See application file for complete search history.

(56) References Cited

U.S. PATENT DOCUMENTS

2011/0168953 A1* 7/2011 Tierney ................ C08G 61/123
252/500
2014/0158982 A1* 6/2014 Park ....................... G02B 6/005
257/13

FOREIGN PATENT DOCUMENTS

| CN | 104616598 A | 5/2015 |
| CN | 104882071 A | 9/2015 |

OTHER PUBLICATIONS

First Chinese Office Action dated Apr. 6, 2017.
Chinese Office Action dated Sep. 5, 2017.

* cited by examiner

DISPLAY DEVICE

TECHNICAL FIELD

Embodiments of the present disclosure relate to a display device.

BACKGROUND

At present, mainstream displays in the market include thin film transistor-liquid crystal display (TFT-LCD) devices and active matrix organic light emitting diode (AMOLED) display devices, where: the TFT-LCD devices control a polarization direction of light emitted from a back light source through a liquid crystal layer, and obtain desired colors and gray scales through filtering by a color filter; the AMOLED display technology does not need any back light source, and transforms power into light directly. However, when the above two display devices display images, at least three sub-pixels of RGB are needed for each pixel, and the setting of the sub-pixels limits resolution improvement of the display devices.

SUMMARY

Embodiments of the present disclosure provide a display device. The display device includes: a plurality of pixel units, where each pixel unit includes two suppression color changing sub-pixel units configured for exciting light waves of different colors. Each suppression color changing sub-pixel unit includes: a first transparent electrostatic sheet and a second transparent electrostatic sheet which are disposed opposite to each other and insulated from each other, where the first transparent electrostatic sheet is disposed on a substrate and the second transparent electrostatic sheet is disposed on the first transparent electrostatic sheet. The display device further includes: a suppression color changing light emitting layer disposed between the first transparent electrostatic sheet and the second transparent electrostatic sheet; and a transparent pressure deformation sensor disposed at a side of the second transparent electrostatic that is away from the substrate.

BRIEF DESCRIPTION OF THE DRAWINGS

In order to clearly illustrate the technical solutions of the embodiments of the disclosure or the technical solutions of the existing technology, the drawings used in the embodiments or the existing technology will be briefly described in the following. It is obvious that the described drawings are only related to some embodiments of the disclosure. Those skilled in the art can obtain other drawing(s) according to these drawings without any inventive work.

DESCRIPTION OF THE REFERENCE NUMERALS

10—substrate; 20—black matrix; 30—suppression color changing sub-pixel unit; 31—first transparent electrostatic sheet; 32—insulation layer; 33—suppression color changing light emitting layer; 34—second transparent electrostatic sheet; 35—transparent pressure deformation sensor; 40—data signal line; 50—control switch; 60—scan signal line; 70—light; 71—excitation light source

DETAILED DESCRIPTION

The technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In order to improve a display efficiency of a display device, embodiments of the present disclosure provides a display device. In the technical solutions of the present disclosure, by using a suppression color changing sub-pixel unit as a component for exciting light waves of different colors, and by reducing the number of sub-pixels included in each pixel, a resolution of the display device and a display effect of the display device can be improved effectively. In order to facilitate the understanding of the technical solutions of the present disclosure, the technical solutions of the present disclosure will be described below in connection with the drawings and the embodiments.

Figure 1:
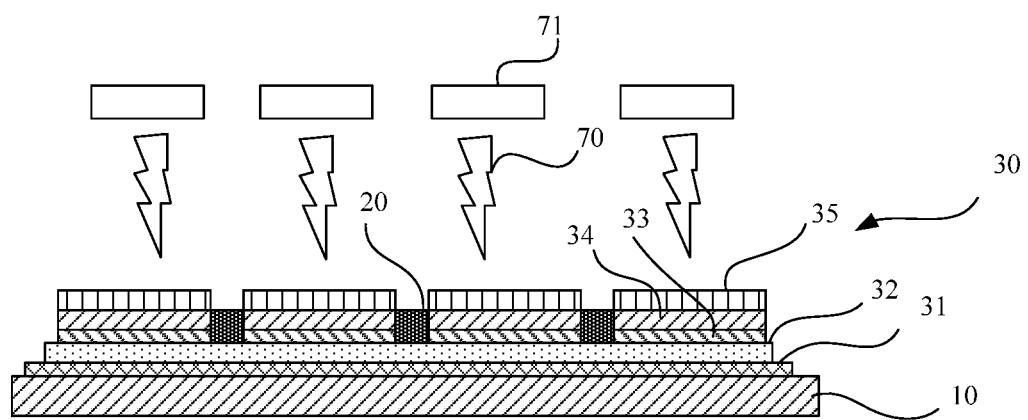
FIG. 1 shows a schematic view of a structure of a display device provided by an embodiment of the present disclosure.

For example, FIG. 1 shows a schematic view of a structure of a display device provided by an embodiment of the present disclosure.

Embodiments of the present disclosure provide a display device, and the display device includes: a plurality of pixel units, where each pixel unit includes two suppression color changing sub-pixel units 30 which are capable of exciting light waves of different colors respectively. The display device further includes an excitation light source 70 for providing lights 71 to the suppression color changing sub-pixel units 30. The suppression color changing sub-pixel unit 30 includes: two transparent electrostatic sheets 31 and 34 which are arranged opposite to each other and insulated from each other, a suppression color changing light emitting layer 33 disposed between the two transparent electrostatic sheets, and a transparent pressure deformation sensor 35 disposed on the transparent electrostatic sheet 34, where the transparent pressure deformation sensor 35 is disposed at a side of the transparent electrostatic sheet 34 that is away from the substrate 10. For example, the transparent electrostatic sheet 34 includes a first side that is away from the substrate 10 and a second side that faces the substrate 10, and the transparent pressure deformation sensor 35 is disposed at the first side of the transparent electrostatic sheet 34 that is away from the substrate 10.

In the embodiment, a filtering effect is realized by adopting the suppression color changing sub-pixel unit 30, and emission of lights with different colors can be realized by the suppression color changing sub-pixel unit 30, so that no color filter is needed for color filtering. Furthermore, the resolution of the display device can be improved effectively by reducing the number of subpixels contained in each pixel, and the display effect of the display device is improved.

Figure 2:
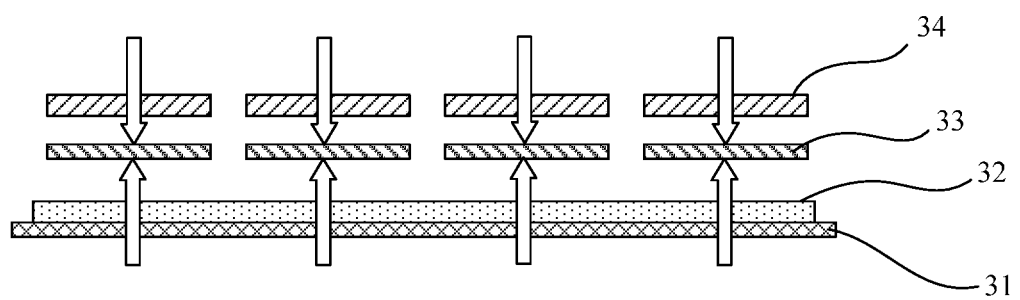
FIG. 2 shows a diagram of a working principle of a display device provided by an embodiment of the present disclosure.
Figure 4:
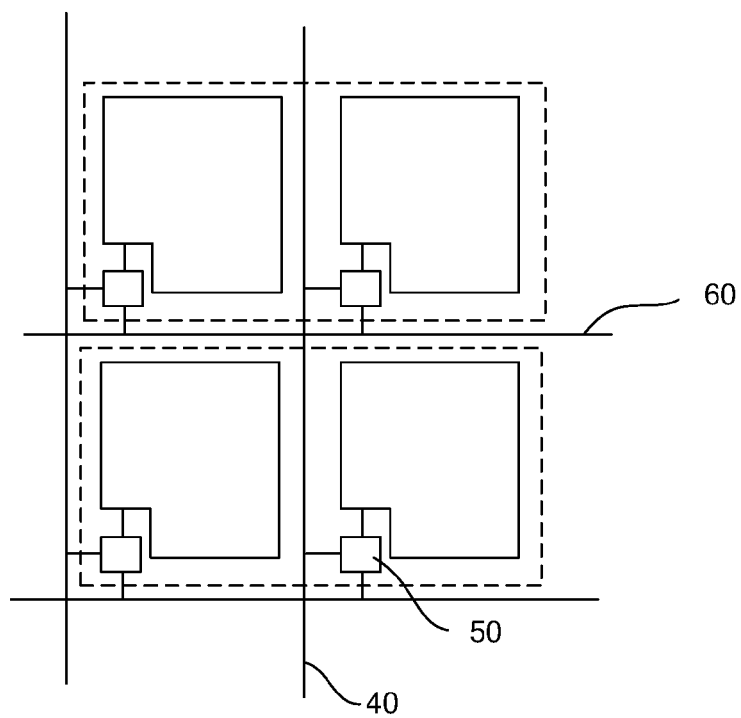
FIG. 4 shows a top view of a display device provided by an embodiment of the present disclosure.

With combined reference to FIG. 4 and FIG. 2, as shown in FIG. 4, the display device provided by the embodiments of the present disclosure includes a plurality of pixel units, and a region of a pixel unit is formed by dividing a display area by data signal lines 40 and scan signal lines 60 of the display device. For example, the display device includes data signal lines 40 and scan signal lines 60 which extend across each other, and the data signal lines 40 and the scan signal lines extend across each other to form a checkerboard shape, and each checkerboard grid corresponds to a region of a pixel unit. In each region, a control switch 50 is configured to control the suppression color changing sub-pixel units 30 in the region and to connect with the data signal line 40 and the scan signal line 60 corresponding to the region.

As shown in FIG. 4, each of the pixel units provided by the embodiments of the present disclosure includes two suppression color changing sub-pixel units 30, and each of the suppression color changing sub-pixel units 30 corresponds to a sub-pixel of a pixel unit. Compared with existing technologies in which each pixel unit includes at least RGB three sub-pixels, in the display device provided by the embodiments of the present disclosure each pixel only needs two suppression color changing sub-pixel units 30, leading to an increase of the number of pixels in each scale unit. Thus, the resolution is improved, and further the display effect of the display device is improved.

Besides, the suppression color changing sub-pixel unit 30 provided by the embodiments can accurately adjust a position of an emission peak of the suppression color changing material to a nanometer level, so that the display effect achieves a good color gamut with rich colors.

For example, the suppression color changing sub-pixel unit provided by the embodiments includes: two transparent electrostatic sheets which are oppositely arranged and insulated from each other, a suppression color changing light emitting layer 33 disposed between the two transparent electrostatic sheets, and a transparent pressure deformation sensor 35 disposed on the transparent electrostatic sheet 34, where the transparent pressure deformation sensor 35 is disposed at a side of the transparent electrostatic sheet 34 that is away from the substrate 10. As shown in FIG. 1, the two transparent electrostatic sheets in the suppression color changing sub-pixel unit 30 include a first transparent electrostatic sheet 31 and a second transparent electrostatic sheet 34 respectively, where the transparent electrostatic sheet which is close to the substrate 10 is the first transparent electrostatic sheet 31, and the transparent electrostatic sheet which is away from the substrate 10 is the second transparent electrostatic sheet 34.

It can be seen from FIG. 1 that the first transparent electrostatic sheet 31 is disposed on the substrate 10, the second transparent electrostatic sheet 34 and the first transparent electrostatic sheet 31 are oppositely arranged and insulated from each other, and the suppression color changing light emitting layer 33 is disposed between the two transparent electrostatic sheets. For example, an insulation configuration is adopted between the first transparent electrostatic sheet 31 and the second transparent electrostatic sheet 34, and the suppression color changing sub-pixel unit 30 further includes an insulation layer 32 disposed between the two transparent electrostatic sheets. The suppression color changing light emitting layer 33 is disposed between the insulation layer 32 and the second transparent electrostatic sheet 34. The suppression color changing light emitting layer 33 is a reversible suppression color changing light emitting layer. Besides, in each pixel unit, wavelengths of lights emitted from the reversible suppression color changing light emitting layers 33 of the two suppression color changing light emitting layers are between 430 nm and 550 nm and between 550 nm and 630 nm, respectively. Thus, lights with different wavelengths can be emitted from the suppression color changing sub-pixel unit 30.

For example, it can be seen from FIG. 1 that the display device further includes a black matrix 20, and the suppression color changing light emitting layers 33 are disposed within grid holes of the black matrix 20. It's to be noted that, the structure of a black matrix 20 provided by the embodiment of the present disclosure can be the same as the structure of a black matrix in the existing technologies, and the grid holes of the black matrix 20 have a one to one correspondence with the sub-pixel units. Referring to FIG. 1, the first transparent electrostatic sheets 31 of the suppression color changing sub-pixel units 30 provided by the embodiments of the present disclosure can be formed by a same transparent electrostatic sheet; for example, the first transparent electrostatic sheets 31 of the plurality of suppression color changing sub-pixel units 30 are designed as an integrated structure, thereby simplifying the fabricating process of the first transparent electrostatic sheets 31. Similarly, the insulation layers 32 can be processed in the same manner, and the insulation layers 32 of the plurality of the suppression color changing sub-pixel units 30 can be formed by a same insulation layer; that is, the insulation layers 32 corresponding to the plurality of the suppression color changing sub-pixel units 30 can also be formed as an integrating structure, thereby simplifying the fabricating process of the insulation layer 32. For each suppression color changing sub-pixel unit 30, the suppression color changing light emitting layer 33, the second transparent electrostatic sheet 34 and the transparent pressure deformation sensor 35 in the structure are disposed in the grid holes.

Figure 3:
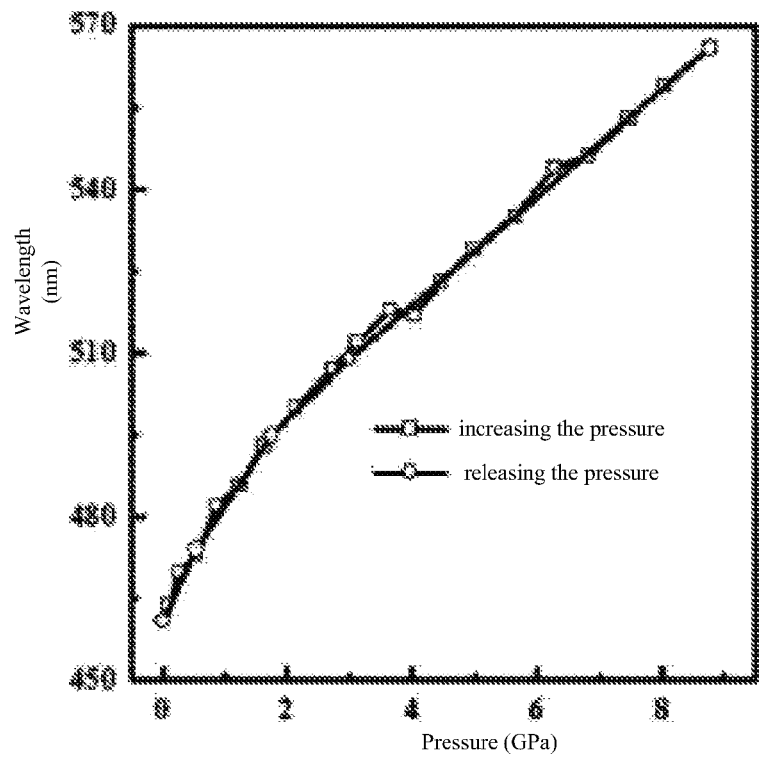
FIG. 3 shows a graph illustrating corresponding relationship between a pressure of a suppression color changing light emitting layer and a wavelength of a light emitted from the suppression color changing light emitting layer.

With combined reference to FIG. 2 and FIG. 3, FIG. 2 shows the working principle of a display device provided by an embodiment of the present disclosure; FIG. 3 shows the stress and the corresponding light emitting principle of the suppression color changing light emitting layers 33 provided by the embodiment of the present disclosure. Firstly, as shown in FIG. 3, light waves with different wavelengths can be emitted when the suppression color changing material of the suppression color changing light emitting layers 33 provided by the embodiments of the present disclosure is subject to pressure or stress, and the stress and the corresponding wavelengths of the emitted light waves are shown in FIG. 3. In the embodiments of the present disclosure, in order to ensure that the emitted light waves can satisfy the light wave requirement of the pixel unit, the wavelengths of the lights emitted from the suppression color changing light emitting layers 33 of the two suppression color changing sub-pixel units 30 in each pixel unit are between 430 nm and 550 nm and between 550 nm and 630 nm respectively, so as to meet the display requirements. For example, the reversible suppression color changing light emitting layer 33 can be made of different materials, including a four styrenic class PAIE (piezofluorochromic aggregation-induced emission materials) compound, a cyano ethylene class PAIE compound and a silolo class PAIE compound and so on. When the above-described material is subject to pressure or stress, lights with different wavelengths can be emitted.

As shown in FIG. 2, when electrostatic charges with same polarity or opposite polarities are formed on the first transparent electrostatic sheet 31 and the second transparent electrostatic sheet 34 respectively, an electrostatic force is generated between the first transparent electrostatic sheet 31 and the second transparent electrostatic sheet 34. Thus, the second transparent electrostatic sheet 34 is deformed, thereby a force being imposed on the suppression color changing light emitting layers 33 to make the suppression color changing light emitting layers 33 to emit light waves with different wavelengths, and display needs of the display device are satisfied. At the same time, the pressure or stress on the suppression color changing sub-pixel unit 30 can be fed back through the transparent pressure deformation sensor 35, so as to ensure that the color of the light wave emitted from the suppression color changing sub-pixel unit 30 can be controlled accurately.

In the embodiments, the suppression color changing light emitting layers 33 transform the lights from the excitation light source into desired light waves. The excitation light source is an excitation light source emitting short wave lights, thereby avoiding the problem of crosstalk. For example, the excitation light source is an ultraviolet LED or a blue LED.

It's to be noted that, in the drawings, for the clarity of the drawings the sizes of layers and areas may be exaggerated. And it can be understood, in the case that a component or a layer called "on" another element or layer, it can be directly on the top of the other elements, or can exist in the middle layer. Besides, it can be understood that, in the case that a component or a layer called "under" another element or layer, it can be directly under the other components, or there are at least two intermediate layers or elements. Besides, it can also be understood that, in the case that a layer or a component called "between" two layers or two elements, it can be the only layer of the two layers or two components, or it also exists at least two intermediate layers or elements. The similar reference marks indicate similar components in the whole text.

In the present disclosure, the terms "the first", "the second", "the third" only used to describe the purpose, and can not be understood as instructions or suggestions of relative importance. The term "a plurality of" refers to two or more than two, unless expressly limited.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present disclosure claims the priority of the Chinese Patent Application No. 201510601402.1 filed on Sep. 18, 2015, which is incorporated herein by reference in its entirety as part of the present disclosure.

The invention claimed is:

1. A display device, comprising:
a plurality of pixel units, wherein each pixel unit comprises two suppression color changing sub-pixel units configured for exciting light waves of different colors, each suppression color changing sub-pixel unit comprises:
a first transparent electrostatic sheet and a second transparent electrostatic sheet which are disposed opposite to each other and insulated from each other, wherein the first transparent electrostatic sheet is disposed on a substrate and the second transparent electrostatic sheet is disposed on the first transparent electrostatic sheet;
a suppression color changing light emitting layer, disposed between the first transparent electrostatic sheet and the second transparent electrostatic sheet, and configured to emit a corresponding light wave according to an imposed stress; and
a transparent pressure deformation sensor, disposed at a side of the second transparent electrostatic sheet that is away from the substrate, and configured to sense and feedback the imposed stress for controlling a wavelength of the emitted corresponding light wave.

2. The display device according to claim 1, wherein the suppression color changing light emitting layer is a reversible suppression color changing light emitting layer.

3. The display device according to claim 1, wherein the two suppression color changing sub-pixel units of each pixel unit comprise two reversible suppression color changing light emitting layers, and wavelengths of lights emitted from the two reversible suppression color changing light emitting layers are between 430 nm and 550 nm and between 550 nm and 630 nm respectively.

4. The display device according to claim 1, further comprising a black matrix, wherein the suppression color changing light emitting layer is disposed in a grid hole of the black matrix.

5. The display device according to claim 1, wherein each suppression color changing sub-pixel unit further comprises an insulation layer disposed between the first transparent electrostatic sheet and the second transparent electrostatic sheet, wherein the suppression color changing light emitting layer is disposed between the insulation layer and the second transparent electrostatic sheet.

6. The display device according to claim 5, further comprising: data signal lines and scan signal lines that extend across each other, wherein the data signal lines and the scan signal lines extend across each other to form a checkerboard shape, and each checkerboard grid corresponds to a region of a pixel unit; and in each region, a control switch is configured to control the suppression color changing sub-pixel unit and to connect with a data signal line and a scan signal line corresponding to the region.

7. The display device according to claim 1, further comprising an excitation light source for providing lights to the suppression color changing sub-pixel units.

8. The display device according to claim 7, wherein the excitation light source is an excitation light source that emits short wave lights.

9. The display device according to claim 8, wherein the excitation light source is an ultraviolet LED.

10. The display device according to claim 8, wherein the excitation light source is a blue LED.

11. The display device according to claim 2, wherein material of the suppression color changing light emitting layer includes a four styrenic class PAIE (piezofluorochromic aggregation-induced emission materials) compound, a cyano ethylene class PAIE compound or a silolo class PAIE compound.

12. The display device according to claim 1, wherein the first transparent electrostatic sheet in each suppression color changing sub-pixel unit is formed by a same transparent electrostatic sheet.

13. The display device according to claim 5, wherein the insulation layer in each suppression color changing sub-pixel unit is formed with a same insulation layer.

14. The display device according to claim 7, wherein the suppression color changing light emitting layer transforms a light emitted from the excitation light source into a light wave with a certain wavelength.

15. The display device according to claim 2, wherein each suppression color changing sub-pixel unit further comprises an insulation layer disposed between the first transparent electrostatic sheet and the second transparent electrostatic sheet, wherein the suppression color changing light emitting layer is disposed between the insulation layer and the second transparent electrostatic sheet.

16. The display device according to claim 3, wherein each suppression color changing sub-pixel unit further comprises an insulation layer disposed between the first transparent electrostatic sheet and the second transparent electrostatic sheet, wherein the suppression color changing light emitting layer is disposed between the insulation layer and the second transparent electrostatic sheet.

17. The display device according to claim 4, wherein each suppression color changing sub-pixel unit further comprises an insulation layer disposed between the first transparent electrostatic sheet and the second transparent electrostatic sheet, wherein the suppression color changing light emitting layer is disposed between the insulation layer and the second transparent electrostatic sheet.

* * * * *